No. 662,640. Patented Nov. 27, 1900.
A. W. GRANT.
RUBBER TIRE SETTER.
(Application filed Sept. 23, 1899.)
(No Model.)

Witnesses
Frank L. Walker
Chas. J. Welch

Inventor
Arthur W. Grant
By his Attorney

UNITED STATES PATENT OFFICE.

ARTHUR W. GRANT, OF SPRINGFIELD, OHIO, ASSIGNOR, BY MESNE ASSIGNMENTS, TO THE CONSOLIDATED RUBBER TIRE COMPANY, OF JERSEY CITY, NEW JERSEY.

RUBBER-TIRE SETTER.

SPECIFICATION forming part of Letters Patent No. 662,640, dated November 27, 1900.

Original application filed February 7, 1898, Serial No. 669,335. Divided and this application filed September 23, 1899. Serial No. 731,376. (No model.)

*To all whom it may concern:*

Be it known that I, ARTHUR W. GRANT, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to improvements in devices for equipping vehicle-wheels with rubber tires, this application being a division of my pending application, Serial No. 669,335, filed February 7, 1898.

My invention relates particularly to that class of rubber tires which are held in place on the peripheries of vehicle-wheels by an endless retaining band or bands which pass through the rubber, the rubber being seated in a groove or between the flanges of a metallic rim, which is secured to the wheel-rim in place of the ordinary band or tire.

The object of my invention is to provide a simple device for joining the ends of the retaining band or bands while the tire is within the channel or groove.

My invention consists in constructions and combinations of parts hereinafter described, and set forth in the claims.

Figure 1:
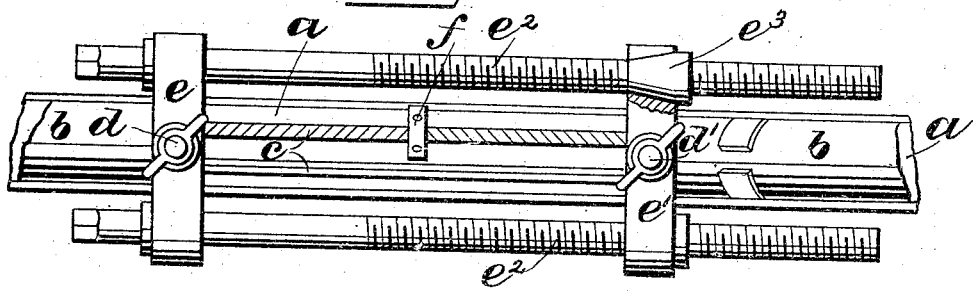
Figure 3:
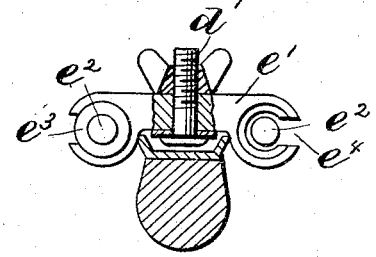
Figure 5:
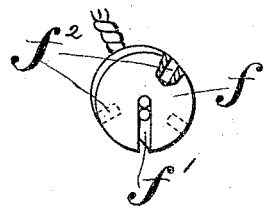
Figure 2:
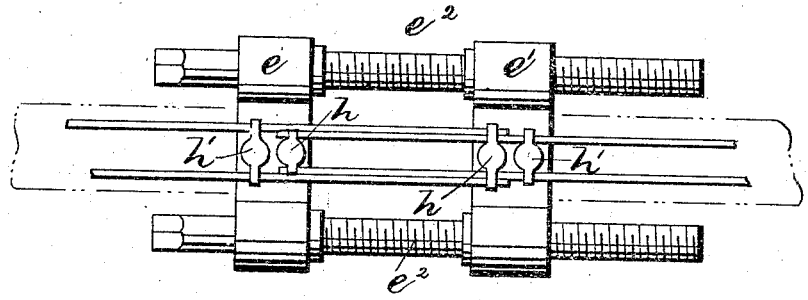
Figure 4:
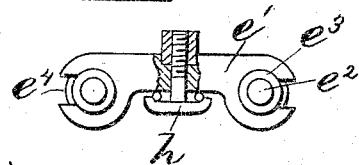

In the accompanying drawings, Figure 1 is a plan view of a device embodying my invention. Fig. 2 is a plan view showing a slight modification of the same. Fig. 3 is a sectional view in detail of Fig. 1. Fig. 4 is a small detail of Fig. 2. Fig. 5 is a view of a device for joining the ends of the wires.

In equipping a wheel with rubber tires by my improved process I take, preferably, though not necessarily, a single strip of rubber, through which is placed a retaining band or bands. If more than one piece of rubber is employed, they will be threaded on the retaining-wires and closed up to form substantially a continuous strip. The retaining band or bands are left sufficiently long to project beyond the ends of the strip thus formed. The rubber is then placed in the flanged groove of the wheel with the ends of the band or bands overlapped. The respective ends of the band or bands are then clamped in jaws, one or both of which are movable with reference to the other, and these jaws (or one of them) are moved so as to tighten the retaining wires or bands and cause them to bind the rubber tightly in the channel.

In Fig. 1 of the drawings, $a$ represents the grooved channel, $b$ the rubber therein, and $c$ the retaining-band, of which two are preferably used, wire being a suitable material from which to form these bands. These bands are clamped by clamps $d$ and $d'$, which are supported on bars $e$ and $e'$. Connecting-screws $e^2$ pass through one of these bars and engage threaded nuts $e^3$ in the other bar. By turning the screws $e^2$ so as to cause the bars $e$ and $e'$ to approach each other the bands may be drawn to any degree of tightness, the ends of the rubber resting against the respective bar. Inasmuch as the rubber is slightly longer than the periphery of the wheel, the rubber will be compressed lengthwise as the wires are tightened, so as to draw the rubber in the channel. This compression is necessary to provide for the closing of the space at the point where the joining is made in the retaining-wires. When the bands have been sufficiently tightened so as to draw the rubber firmly in the channel, the ends of the wires are cut off to the proper length and united together. This may be accomplished in any suitable and well-known manner—such as brazing, soldering, twisting, or by intermediate connecting devices, such as a screw-threaded sleeve, or in any other manner which will readily suggest itself.

In Fig. 5 I have shown the wires twisted, a twisting-head $f$ being employed, having a slot $f'$, adapted to fit over the overlapping ends of the wire in such a manner that as the head is rotated the free ends of the wire will be twisted together. By thus twisting the respective ends a splice something like the splice in a telegraph-wire will be formed by what is known as a "right-and-left" twist. For this purpose the head $f$ may be provided with openings $f^2$ on its periphery, into which a wrench or other suitable device for turning the same may be made to engage.

I have shown the screws $e^2$ passing through nuts or sleeves $e^3$, which are tapered on the outer peripheries and fit in tapered seats in the bar $e'$. The bar $e'$ is slotted, as shown in $e^4$, so that the screws $e^2$ can pass through the slots; but when the tapered sleeves or nuts are fitted in the openings, said nuts being of larger diameter than the slots, they will be held in the bar.

In Figs. 2 and 4 I have shown the device modified, in which the bars $e$ and $e'$ are caused to tighten the band or bands by pressing the said bars apart instead of drawing them together. In this construction I have preferably employed on each bar two clamps $h$ and $h'$, which are adapted to project within the wheel-channel and engage the retaining-wires. The clamp $h$ on the bar $e'$ has a long jaw, which at its ends engages the outer bands, and there are intermediate openings in same to admit of the loose passage of the inner bands, as shown in Figs. 2 and 4, and the clamp $h$ on the bar $e$ has a short jaw, the ends of which engage the inner bands, as shown in Fig. 2. When the tire, with the band or bands, is in place within the rim, the band or bands at the ends thereof are first engaged by the clamps $h$ on the respective bars, the jaws of said clamps $h$ when so engaged being adapted to allow the other ends of the band or bands to pass or slip through the same, and loosening the jaws of the clamps $h'$, so that the band or bands will slip through same, and forcing the bars apart by the screws $e^2$ the bands will be tightened and the tire compressed in the channel at the same time. After they have been sufficiently tightened the clamps $h'$ on the respective bars are tightened and the clamps $h$ released. This frees the respective ends of the bands and clamps the bands at a point removed from the ends, so that by placing the twisting device midway between the bars the ends of the bands may be twisted together by a few turns of the twisting device, the free ends being held in position by clamps $h$ $h$, but permitted to move longitudinally to compensate for the material taken up in twisting, or the bands may be severed midway between the bars and joined together by welding, brazing, or by the connecting devices before described.

Having thus described my invention, I claim—

1. The combination with the screw-threaded rods and the cross-bars, of band-holding clamps connected to the bars, one of said bars being provided with slotted openings and tapered seats, and tapered nuts on said screw-threaded rods adapted to fit in said seats, substantially as and for the purpose specified.

2. The combination with the screw-threaded rods and the cross-bars, of a double set of clamps on said cross-bars, one set of said clamps being adapted to hold the band, or bands, in tightening the same, and the other set to hold the same after they have been tightened substantially as specified.

3. The combination with a channel-rim, a rubber tire therein, and a band, or bands, passing through said wire, movable bars, each of said bars being provided with a double set of clamping devices, one set of said clamping devices being adapted to engage the ends of said band, or bands, and the other set to engage the said band, or bands, at a point removed from the ends, and means for forcibly moving said bars to cause the clamping devices to recede from each other substantially as specified.

4. The combination with a channel-rim, a rubber tire therein, having the band, or bands, extending through the same, movable bars each having a double set of clamping devices, one set of said clamping devices being adapted to engage the bands at the ends thereof and the other set at a point removed from the ends thereof, and a twisting device adapted to engage said bands between the said clamps, substantially as and for the purpose specified.

5. The combination with the cross-bars having the clamping devices, screw-threaded rods extending through said cross-bars, one of said cross-bars being provided with tapered openings, and tapered nuts fitted in said openings, said tapered openings being slotted to permit the screw-threaded rods to pass through when the tapered nuts are removed from said bars, substantially as specified.

In testimony whereof I have hereunto set my hand this 16th day of September, A. D. 1899.

ARTHUR W. GRANT.

Witnesses:
CHAS. I. WELCH,
CLIFTON P. GRANT.